(No Model.)
R. S. MITCHELL.
PITMAN.
No. 348,034. Patented Aug. 24, 1886.
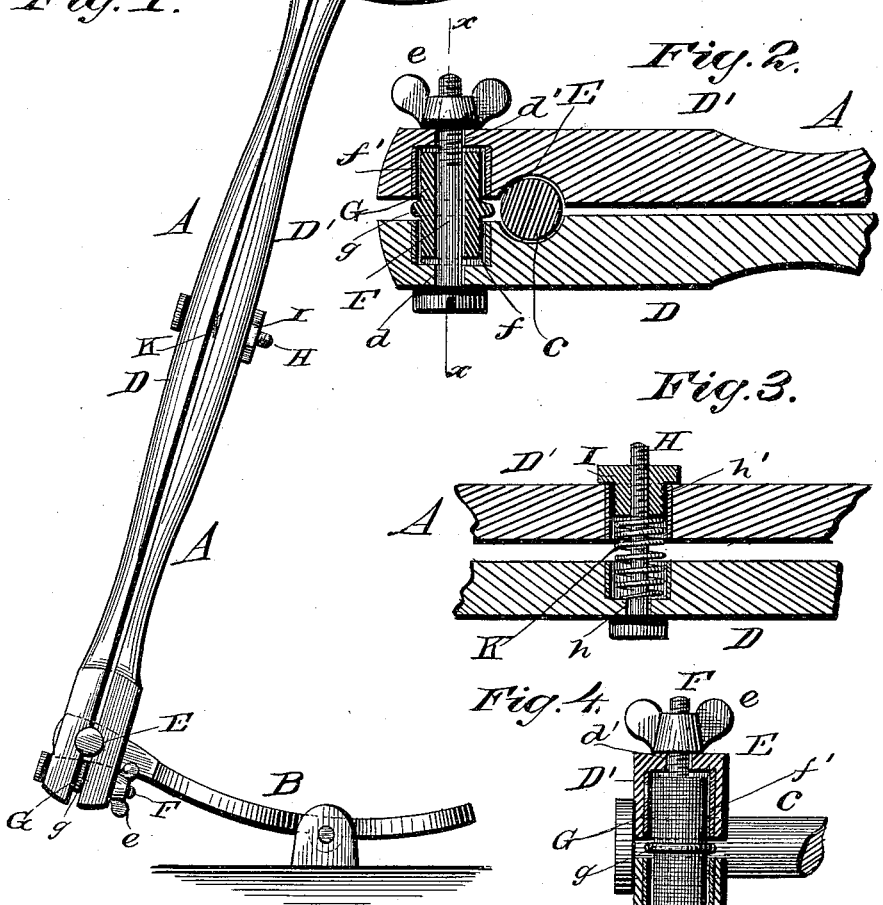
WITNESSES
Phil C. Dieterich.
A. E. Sowell.
INVENTOR.
Rufus S. Mitchell
by W. S. Alexander
Attorney

UNITED STATES PATENT OFFICE.

RUFUS S. MITCHELL, OF BEARDSTOWN, ILLINOIS.

PITMAN.

SPECIFICATION forming part of Letters Patent No. 348,034, dated August 24, 1886.

Application filed April 10, 1886. Serial No. 198,446. (No model.)

*To all whom it may concern:*

Be it known that I, RUFUS S. MITCHELL, of Beardstown, in the county of Cass and State of Illinois, have invented certain new and useful Improvements in Pitmen; and I do hereby declare that the following is a full, clear, and exact description thereof, reference being had to the accompanying drawings, and to the letters of reference marked thereon, which form part of this specification, in which—

Figure 1 is a side view of my improved pitman and its connections with a wheel and treadle. Fig. 2 is a vertical longitudinal sectional view of one end of the pitman, enlarged. Fig. 3 is a similar view of the central portion, and Fig. 4 is a transverse section on line $x$ $x$ of Fig. 2.

This invention relates to improvements in pitmen and connecting-rods, such as are adapted to be used upon sewing-machines and such light motors, the objects being to construct a pitman that can be easily and quickly moved from and put into place, and that has its bearings so constructed that the wear upon the journals can be readily taken up or the bearings accommodated to the journal-points.

The invention consists in the construction and novel arrangement of parts, hereinafter described, illustrated in the accompanying drawings, and particularly pointed out in the claims.

In the drawings, A designates the pitman, having one end connected to a treadle, B, and the other end to a wrist-pin, $c$, on a rotatory disk, as shown, the said disk and treadle forming parts of some light motor. The pitman is made of two equal and similar parts, D D', which have their facing surfaces flat and their outer surfaces modeled to any desired shape. These parts are of wood or other suitable material.

The bearings E E and their connections are similar, so that a description of one only is necessary. Each of said bearings is situated near one end of the pitman, and each has one-half of it made in each piece D and D'. Through each end of the pitman, outside of the bearing E, passes the screw F, through suitable openings, $d$ $d'$, in the parts D D', respectively. The head of said screw bears on the part D, and the part D' has a bearing upon a thumb-nut, $e$. The meeting ends of the openings $d$ $d'$ are circularly chambered at $f f'$ and preferably metal-lined.

G is a rubber spring-block surrounding the screw F, having the central circumferential bead $g$, and with its ends resting against the floors of the chambers $f f'$.

H is a screw passing about centrally through the parts D D', with its head resting against the former. The screw-opening $h$ in the part D is chambered at its inner end. The screw-opening $h'$ in the part D' is enlarged throughout, both being preferably metal-lined.

I is a cylindrical nut entering the outer orifice of the opening $h'$, engaging the screw H, and provided with a circular flange to engage the outer surface of the part D'.

K is a spiral spring surrounding the screw H, and with one end against the floor of the chambered part of the opening $h$, and the other against the inner end of the nut I. If desired, the spring K may be a rubber spring, similar to the springs G, and the nut I may be a thumb-nut; or the end springs and nuts may be similar to the central ones.

It is evident that as the bearing parts wear the journal-bearings may be taken up by means of the screws and nuts to accommodate themselves thereto, and that the springs will always keep the nuts and screws tight, so that the journals will be both sufficiently tight and at the same time easy. The beads $g$ of the rubber springs enter between the parts D D', and aid in the effect of the springs. It is also evident by the pitman being made in two parts, connected as described, it can be put in and taken out of place very easily and quickly. Only the end screws and springs may be used, though it is preferable to have a screw and spring between, and, if desired, more than three sets of springs and screws may be used.

If desired, a rubber spring may be interposed between the heads of the bolts and the main body of the pitman, and also between the thumb-screw and pitman, outside of the interposed springs in the recesses of the pitman-rod. These springs aid, in case the thumb-screw or bolts were screwed up too tightly, to prevent wear on the journals of the pitman or on the crank-pin by friction.

Having described my invention, I claim—

1. In a pitman, the combination of two equal and similar longitudinal parts having one-half of both journal-bearings situated in each, and connected near their ends by spring-surrounded screws, so that the wear of the journal-bearings can be taken up, all substantially as described.

2. In a pitman, the combination of the equal parts D D', having journal-bearings E, the screws F H, nuts e l, and springs G K, all constructed and arranged substantially as and for the purpose specified.

In testimony that I claim the foregoing as my own I affix my signature in presence of two witnesses.

RUFUS S. MITCHELL.

Witnesses:
FELIX J. KESLER,
F. W. SCHIERBAUM.